United States Patent [19]

McDaniel et al.

[11] Patent Number: 5,037,911

[45] Date of Patent: Aug. 6, 1991

[54] POLYMERIZATION WITH SURFACE SILICATED AND FLUORIDED ALUMINA SUPPORTED CHROMIUM

[75] Inventors: Max P. McDaniel, Bartlesville, Okla.; Paul D. Smith, Seabrook, Tex.; Donald D. Norwood, Bartlesville, Okla.

[73] Assignee: Phillips Petroleum Company, Bartlesville, Okla.

[21] Appl. No.: 272,565

[22] Filed: Nov. 17, 1988

Related U.S. Application Data

[62] Division of Ser. No. 615,001, May 29, 1984, Pat. No. 4,806,513.

[51] Int. Cl.$^5$ ............... C08F 4/02; C08F 4/12/4/78
[52] U.S. Cl. ............................. 526/130; 526/105; 526/106; 526/118; 526/129; 526/154; 526/156; 526/160; 526/170; 526/352
[58] Field of Search ............ 526/154, 156, 170, 129, 526/130, 105, 106, 118, 160

[56] References Cited

U.S. PATENT DOCUMENTS

| | | | |
|---|---|---|---|
| 3,969,386 | 7/1976 | Ballard et al. | 260/429 R |
| 4,018,707 | 4/1977 | Wyatt | 252/430 |
| 4,057,584 | 11/1977 | Settsu et al. | 260/593 |
| 4,080,311 | 3/1978 | Kehl | 252/437 |
| 4,337,366 | 6/1982 | Fattore et al. | 568/698 |
| 4,364,839 | 12/1982 | McDaniel et al. | 252/430 |
| 4,364,841 | 12/1982 | McDaniel et al. | 252/430 |
| 4,392,988 | 7/1983 | Dobson et al. | 252/455 R |
| 4,397,765 | 8/1983 | McDaniel | 252/430 |
| 4,478,988 | 10/1984 | Pullukat et al. | 526/156 X |
| 4,482,642 | 11/1984 | Ettlinger et al. | 502/232 |

FOREIGN PATENT DOCUMENTS

| | | | |
|---|---|---|---|
| 5334705 | 3/1978 | Japan | 502/104 |
| 1314784 | 4/1973 | United Kingdom | 526/156 |

OTHER PUBLICATIONS

Chem. Abs., 550, 87:84531f (1977).

Primary Examiner—Fred Teskin
Attorney, Agent, or Firm—Phillips Petroleum Co.

[57] ABSTRACT

In one embodiment of this invention a surface silicated alumina composition, as opposed to conventional silica alumina, is provided. Such composition may also be fluorided and/or phosphated or phosphited. The resulting compositions are broadly useful but are of particular applicability as supports for chromium olefin polymerization catalysts. In another aspect alumina is fluorided and used with hexavalent chromium catalyst and a cocatalyst or in the alternative with an organochromium catalyst. If desired the support in this embodiment can also be phosphated or phosphited. In another embodiment, aluminum phosphate is formed in the pores of alumina. In contrast with alumina catalyst supports of the prior art, the supports of this invention allow for the production of olefin polymers at high rates of productivity. Also novel high density ultrahigh molecular weight polymers are produced.

7 Claims, 2 Drawing Sheets

POLYMERIZATION WITH SURFACE SILICATED AND FLUORIDED ALUMINA SUPPORTED CHROMIUM

CROSS REFERENCE TO RELATED APPLICATIONS

This is a divisional of copending application Ser. No. 615,001, filed May 29, 1984, now U.S. Pat. No. 4,806,513.

BACKGROUND OF THE INVENTION

This invention relates to treated alumina.

Supported chromium oxide catalysts have long been used to prepare olefin polymers in hydrocarbon solution or slurry to give products having excellent characteristics from many standpoints. A number of supports have long been broadly disclosed in the art for chromium oxide catalysts including silica, alumina, thoria, zirconia, silica alumina, and other refractory materials. However, as a practical matter only predominately silica supports have achieved substantial commercial success. Alumina which is almost always included in the prior art in the list of suitable supports, while operable, invariably causes productivity to be extremely low. The preferred prior art support, silica, also suffers from disadvantages among which is the inability to produce ultra high molecular weight polymer using hexavalent chromium.

SUMMARY OF THE INVENTION

It is an object of this invention to provide an improved alumina.

It is a further object of this invention to provide a chromium catalyst capable of giving high productivity.

It is a further object of this invention to provide a chromium catalyst capable of producing ultra high molecular weight polymer.

It is a further object of this invention to provide a catalyst suitable for use in slurry polymerization systems.

It is still a further object of this invention to produce a catalyst capable of making branched polyethylene in the 0.960–0.930 density range from ethylene alone.

It is still a further object of this invention to provide catalysts having a wide sensitivity to $H_2$ as a MW regulating agent, from almost no sensitivity to highly sensitive.

It is still a further object of this invention to prepare intimate bimodal mixtures of high and low MW polymers for use in film and blow molding.

It is still yet a further object of this invention to overcome the difficulties traditionally associated with both alumina and silica as supports for chromium-catalyzed olefin polymerization.

In accordance with one aspect of this invention a silicated alumina is provided, which alumina can also be fluorided and/or phosphated.

In accordance with another aspect of this invention, a fluorided and/or silicated alumina support is used for a chromium olefin polymerization catalyst.

In accordance with still another aspect of the invention aluminum phosphate is formed in the pores of alumina.

DESCRIPTION OF THE PREFERRED EMBODIMENTS

Figure 1:
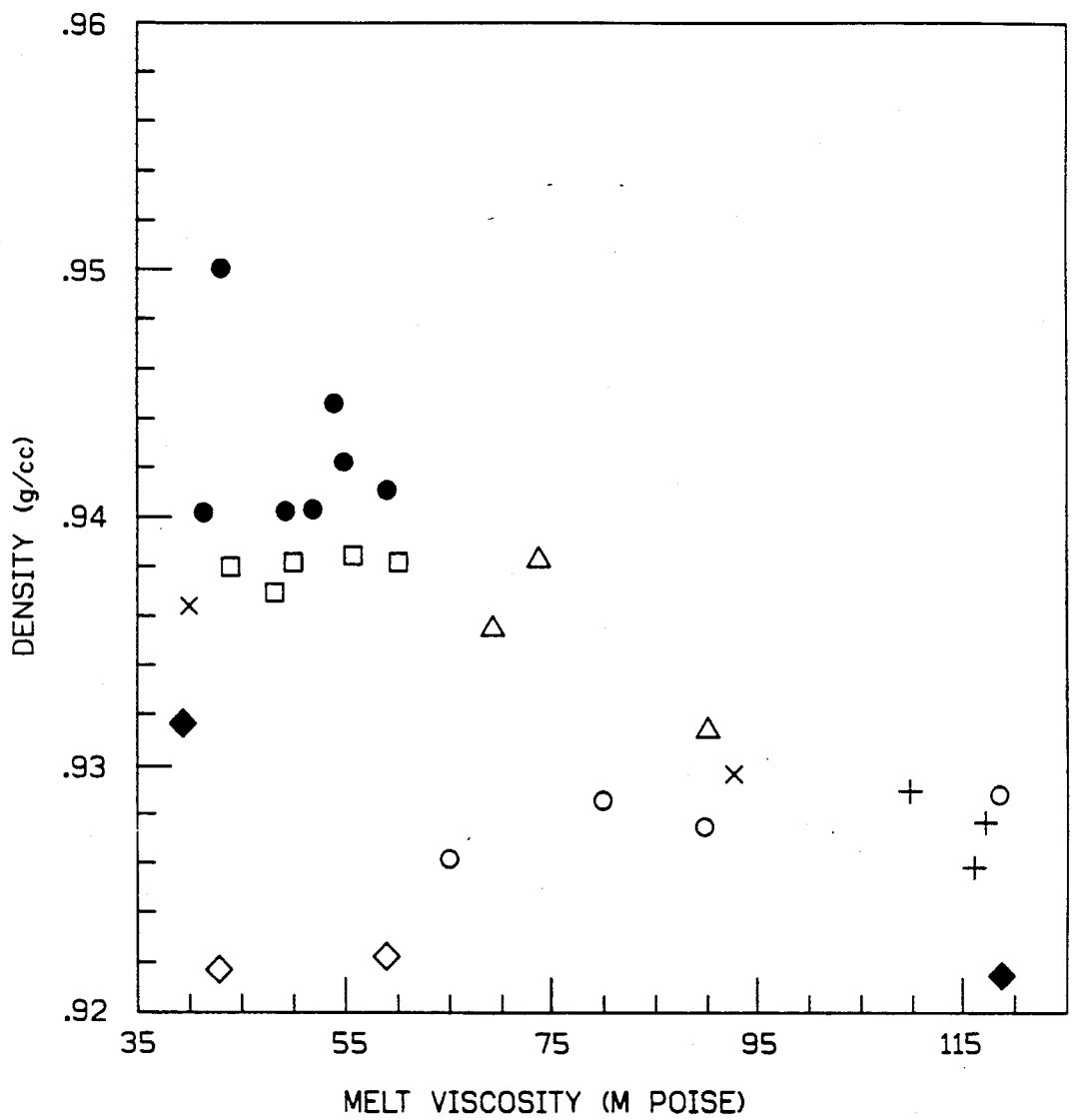
FIG. 1 shows the relationship between density and melt viscosity for UHMWPE polymers made with a variety of catalyst systems.

The alumina selected for surface treatment according to this invention can also contain minor amounts of other ingredients which do not adversely affect the quality of the final catalyst but it is generally essentially pure alumina. The alumina can be made as is well known in the art, for instance, by reacting sodium aluminate, which is basic, with aluminum sulfate, which is acidic, or by neutralizing an aluminum salt with a base such as ammonia or ammonia hydroxide, or by flame hydrolysis. If desired, the alumina can be calcined prior to treatment for instance by heating in air at a temperature of 300°–900° C., preferably 500°–800° C. but this is not essential.

The amount of combined fluorine is generally in the range of 0.1 to 5, preferably 0.5 to 3 weight percent fluorine, based on the weight of the alumina.

The surface silicated alumina is prepared by contacting the alumina with a silicating agent, generally by forming a slurry of the alumina in a solution of a silicating agent. Generally a lower alcohol such as a one to 6 carbon atom alcohol is used as the solvent. After the solution and alumina are mixed the composite is dried. Alternatively the alumina can be subjected to a vapor of the silicating agent. The silicating agent is used in an amount to give 0.2 to 20, preferably 0.5 to 10 weight percent silica, based on the weight of the alumina. The resulting product is alumina with a surface coating of silica which is different than conventional silica-alumina.

The resulting novel product is suitable as a catalyst support but is also suitable for use broadly where alumina is utilized.

The term "silicating agent" is meant to encompass silicon alkoxides and aryloxides and their hydrolysis products, e.g. alkoxysiloxanes, which upon calcining in the activation of the support or catalyst yield high purity, refractory silica. Examples of such compounds include tetramethoxysilane, tetraethoxysilane (tetraethyl orthosilicate), tetra(2-ethylbutoxy)silane, tetrakis(2-methoxyethoxy)silane, tetraphenoxysilane, and phenyltriethoxysilane and their hydrolysis products and mixtures thereof. A presently preferred silicating agent comprises a polymeric siloxane form of tetraethoxysilane containing the equivalent of 40 weight per cent silica. Such a composition is commercially sold as Silbond ® 40 by Stauffer Chemical Co., Westport, Conn.

The silicating agent can be converted to surface silica after the treatment by calcining as described above or the treated alumina can be allowed to stand until hydrolysis converts the treating agent to silica.

In accordance with another embodiment the alumina is treated with a fluoriding agent so as to incorporate fluorine onto the alumina to produce a support for a hexavalent chromium catalyst which is used with a cocatalyst or as a support for an organochromium catalyst. A preferred fluoriding agent is ammonium bifluoride, $NH_4HF_2$. Also suitable is ammonium silicofluoride, $(NH_4)_2SiF_6$. While ammonium silicofluoride contains both silicon and fluorine, and while as will be discussed hereinafter, a combination of silicating and fluoriding is within the scope of the invention, ammonium silicofluoride probably does not incorporate anything except the fluorine since the silicon is lost during heating. The fluoriding agent can be combined with the alumina in any suitable manner but it is generally done by forming a slurry of the alumina in a solution of the fluoriding agent and a suitable solvent such as alcohol or water. Particularly suitable are one to three carbon atom alcohols because of their volatility and low surface tension. A suitable amount of the solution is utilized to provide the desired concentration of fluorine in the composite after drying. Drying can be effected in a conventional manner, such as suction filtration followed by evaporation or drying under vacuum. In view of the use of a relatively volatile solvent such as methanol, relatively mild conditions such as 100° C. or less can be utilized.

A combination of fluoriding and silicating to give F-Si/$Al_2O_3$ can also be utilized. In such instances, it is preferred to add the fluoriding agent first and most preferred to dry after adding the fluoriding agent before adding the silicating agent. This is because in some instances adding the fluoriding agent after the silicating agent and/or after the chromium can cause an undesirable precipitate. It is possible, however, to add the ingredients in any order.

If desired, the fluorided alumina, silicated alumina or fluorided and silicated alumina can be further treated with a phosphating or phosphiting agent to give a system containing up to five components on adding chromium, i.e. P-F-Si-Cr/$Al_2O_3$. Thus the phosphated or phosphited support can be P-F-Si/$Al_2O_3$, P-F/$Al_2O_3$ or P-Si/$Al_2O_3$. Generally when a phosphating or phosphiting agent is to be used in conjunction with the fluoriding or silicating, the phosphorus treatment is carried out first.

The phosphating or phosphiting agent may be incorporated in an organic water-miscible liquid such as an alcohol and used to treat either a hydrogel or a xerogel. If the starting material is a hydrogel, then the organic liquid/phosphating agent composition effects both the conversion of the hydrogel to a xerogel and provides the phosphating or phosphiting level desired. More specifically if a hydrogel is used, the hydrogel may be washed with water, then with an organic liquid such as isoamyl alcohol or methanol containing the phosphating or phosphiting agent such as phosphoric acid, or phosphorous acid then filtered and the solvent allowed to evaporate. Alternatively the alumina gel can be treated with a vapor of the phosphating or phosphiting agent.

The phosphating or phosphiting agent is preferably used in an amount to react with the alumina to give a P/Al atom ratio of the reaction product on the surface of 0.01:1 to 0.3:1, preferably 0.05:1 to 0.2:1. In practice, however, it is possible to use as much phosphating or phosphiting agent as desired with the excess simply being washed off after the phosphating or phosphiting treatment is complete. The phophating or phosphiting treatment is generally carried out on alumina which has been previously calcined in air at 300°–700° C. The phosphating or phosphiting treatment is generally carried out at a temperature of 15° C. to 500° C., preferably room temperature to the boiling point of the solvent if a phosphate or phosphite solution is used or about 200° C. if a vapor is used and a time of 1 minute to 2 hours, preferably 2 minutes to 30 minutes. Generally a methanolic solution of $H_3PO_4$ is used.

Stated in other terms, the phosphorus component is added in an amount to give 1 to 30, preferably 5 to 20 mole percent of the phosphorus compound incorporated based on the total moles of aluminum. Generally, the ratio of atoms of phosphorus per atom of chromium will be in the range of 100–3000, preferably 500 to 2000. Based on the surface area, the phosphorus compound from the phosphating agent is preferably present in an amount sufficient to give about 0.005 to 1, preferably about 0.01 to 0.5 mg P/$m^2$ of alumina surface as measured by BET nitrogen sorption.

There are two aspects to the invention as far as the type of chromium compound is concerned. In the first aspect, the chromium compound can be any compound in or convertible to the hexavalent state and can be introduced anytime prior to activation. The catalyst contains chromium in an amount generally within the range of about 0.001 to 10, preferably 0.1 to 5, more preferably about 1 weight percent based on the weight of the dried treated alumina support, or since the amount of incorporated treating agent is relatively small, 0.001 to 10, preferably 0.1 to 5, more preferably about 1 weight percent based on the alumina. The chromium compound can be incorporated as known in the art. For instance, a hydrocarbon solution of a material such as tertiary butyl chromate can be used to impregnate the xerogel or an aqueous solution of a chromium compound such as $CrO_3$ (chromium trioxide), chromium acetate or chromium nitrate can be added to the hydrogel before drying or chromium can be coprecipitated along with the alumina. Preferably the chromium is added after any fluoride treatment and after any phosphorus treatment.

The activation of the chromium-containing catalyst can be carried out at a lower temperature than is generally required for activating silica-based chromium catalysts. Temperatures of 300°–900° C., preferably 500°–800° C., are suitable. The activating ambient can be any oxidizing ambient but for reasons of convenience is generally air. Times of 1 minute to 48 hours, preferably 0.5 to 10 hours are suitable. If desired, the alumina can also be precalcined prior to treatment using the same conditions used later for activation.

In the second aspect of this invention so far as the type of chromium is concerned, an organochromium compound wherein the chromium has less than its maximum valence can be used. Of course an organochromium of the type described herein can also be used in the first aspect as the chromium source for conversion on calcination to hexavalent chromium. In this aspect, however, organochromium is introduced after high temperature activation of the support rather than before. The same temperature and ambient used for activating the catalyst in the first aspect can be utilized for activating the support in the second aspect, although greater leeway is possible with temperatures as low as 150° C. and as high as 1000° C. being operable for activating the support prior to the introduction of the chromium. The organochromium compounds can include zerovalent compounds such as pi bonded chromium complexes such as dicumene chromium or dibenzene chromium. These pi bonded zerovalent chromium compounds are disclosed in more detail in Delap, U.S. Pat. No. 3,976,632 which issued Aug. 24, 1976, the disclosure of which is hereby incorporated by reference. Also suitable are divalent organochromium compounds such as chromocene, bis-(cyclopentadienyl)chromium (II), and substituted derivatives thereof in which the cyclopentadienyl rings contain one or more substituents.

Chromocene offers the advantage of giving high density, ultra high molecular weight polymer. The organochromium compounds on the treated alumina also tend to have exceptional sensitivity to the effects of hydrogen, thus allowing great leeway in the control of molecular weights since the catalyst inherently gives ultra high molecular weight and yet with the sensitivity to hydrogen it is possible to produce polymers with a broad spectrum of molecular weights with a single catalyst.

The currently preferred organochromium compounds, however, are those of either the formula (I) or (II) below:

$$Cr(R)_n \qquad (I)$$

$$Cr_x(R)_{2x} \qquad (II)$$

wherein n is 3 or 4; x is 3 or more; R is —$CH_2MR'R''R'''$; wherein M is a Group IVA element, i.e. C, Si, Ge, Sn or Pb; and wherein in a given compound the R groups are identical and R', R", and R''' are the same or different (preferably the same) hydrocarbyl groups selected from aliphatic and aromatic radicals containing up to about 10 carbon atoms per radical, preferably alkyl radicals containing up to 4 carbon atoms per radical. Also included are combination radicals such as alkaryl. The preferred compound of Formula I is the one wherein M is Si, R', R" and R''' are methyl (—$CH_3$), and n is 4, $Cr[—CH_2Si(CH_3)_3]_4$, i.e. tetrakis-(trimethylsilylmethyl)chromium (IV). For Formula II, the preferred compound is the one wherein M is Si, R', R", and R''' are methyl(—$CH_3$), and x=4; i.e. the tetramer, $Cr_4[—CH_2Si(CH_3)_3]_8$, octakis-($\mu$-trimethylsilylmethyl)tetrachromium(II).

Examples of other suitable compounds of Formula (II) include octakis(benzyldimethyl-silylmethyl) tetrachromium and octakis(allyldimethylsilylmethyl) tetrachromium. These compounds on alumina treated in accordance with this invention exhibit activity which is truly remarkable and also exhibit substantial responsiveness to the effects of hydrogen.

It is also possible to use a mixture of two or more chromium components, for instance, as follows: chromium (+6)-chromium (0); chromium (+6)-chromium (+2); chromium (+2)-chromium (0); or two different chromium (0) components or two different chromium (+2) components or a chromium (0) component and a chromium (+2) component. Use of two components selected from chromium (0) and chromium (+2) is particularly desirable.

It is also possible to use mixtures of the total catalyst, i.e. a catalyst of this invention in combination with conventional chromium or vanadium on silica or chromium or vanadium on aluminum phosphate or a titanium or zirconium system.

The amount of organochromium compound relative to the support can range from about 0.02 mmole of chromium compound per gm of support to about 5 mmoles chromium compound per gram support.

Another embodiment of this invention, called "pore cogel" for convenience utilizes any of the treated supports described herein, into the pores of which aluminum phosphate gel is formed. In accordance with this embodiment, the treated support is impregnated with a liquid containing a source of phosphate ions and an aluminum salt and thereafter a neutralizing agent is added to form a gel. Preferably the treated support is calcined at 300°-900° C., preferably 500°-800° C. as described hereinabove in regard to activation prior to this impregnation. If the thus formed composition is to be used as a catalyst base, as for instance for chromium, the catalyst can be present before calcining or can be added before, during or after formation of the aluminum phosphate gel. The aluminum component is preferably aluminum nitrate although aluminum chloride or other aluminum salts can be used. The source of phosphate ions is preferably orthophosphoric acid although dihydrogen ammonium phosphate, and hydrogen diammonium phosphate, for instance, can also be used. The liquid is generally water although a polar organic solvent can be used. Alternatively an untreated alumina support can be used, the formation of the phosphate serving to treat and thus "activate" the normally inactive alumina.

While any agent which neutralizes acid can be used, a base such as concentrated ammonium hydroxide, ammonia gas, or ammonia dissolved in alcohol or other nonaqueous solvents is preferred. Also ammonium carbonate, ethylene oxide and propylene oxide can be used. The neutralization agent is added in an amount to give gelation essentially instantaneously down to a lesser amount wherein gelation will occur on standing for up to 1 hour.

The final pore cogel can be finished by washing with water and/or alcohol or such washing can be omitted. When this pore cogel is used as a support for a catalyst component such as a chromium compound it provides an intimately formed two component catalyst as contrasted with a mixture or a unitary composition.

The hexavalent Cr catalysts of this invention are generally used in conjunction with a cocatalyst. Suitable cocatalysts include organoaluminum and organoboron compounds. The most preferred boron compounds are trihydrocarbyl boron compounds, particularly tri-n-butylborane, tripropylborane, and triethylborane (TEB). Other suitable boron compounds include trialkyl boron compounds broadly, particularly those having alkyl groups of 1 to 12 carbon atoms, preferably 2 to 5 carbon atoms, triaryl boron compounds such as triphenylborane, alkyl boron alkoxides such as $B(C_2H_5)_2OC_2H_5$ and halogenated alkyl boron compounds such as $BC_2H_5Cl_2$. Suitable aluminum alkyls include $R_3^4Al$, $R_2^4AlX$ and $R^4AlX_2$ compounds where $R^4$ is a 1 to 12 carbon atom hydrocarbyl radical and X is a halogen, preferably chlorine. Triethylaluminum and diethylaluminum chloride are particularly suitable.

The cocatalyst is used in an amount within the range of about 0.2 to 25, preferably 0.2 to 10 parts per million based on the solvent or diluent in systems employing a solvent or diluent. If no solvent or diluent is used the cocatalyst is impregnated onto the catalyst in an amount to give a mole ratio of cocatalyst:chromium (atoms) within the range of 0.5:1 to 5:1. Based on the chromium in the catalyst in systems employing a solvent or diluent the cocatalyst is used in an amount so as to give from 0.01 to 3, preferably 0.1 to 2 times as much boron or aluminum by weight as chromium by weight. Based on atoms of boron or aluminum per atom of chromium, the amount of cocatalyst used will give about 0.05 to about 14, preferably about 0.5 to about 10 atoms of boron or aluminum per atom of chromium.

The cocatalyst can be either premixed with the catalyst or introduced into the reactor as a separate stream, the latter being the preferred procedure.

Of course, the final catalyst can be used with, or contain, other ingredients which do not adversely affect its performance, as, for example, other cocatalysts, antistatic aids in the polymerization zone and other conventional ingredients.

The catalyst of this invention can be used to polymerize at least one mono-1-olefin containing 2 to 8 carbon atoms per molecule, preferably ethylene, propylene, 1-butene, 1-pentene, 1-hexene and 1-octene. The invention is of particular applicability in producing ethylene homopolymers and copolymers from mixtures of ethylene and 0.5 to 20 mole percent of one or more comonomers selected from 1-olefins containing 3 to 8 carbon atoms per molecule. Exemplary comonomers include aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,5-hexadiene, and other such diolefins and mixtures thereof. Ethylene copolymers preferably constitute at least about 90, preferably 97 to 99.6 weight percent polymerized ethylene units. Propylene, 1-butene, 1-pentene and 1-hexene are especially preferred comonomers for use with ethylene.

The polymers can be prepared from the catalyst of this invention by solution polymerization, slurry polymerization, and gas phase polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. The catalyst of this invention can be used to produce ethylene polymers in a particle form process as disclosed in U.S. Pat. No. 3,624,063 which issued Nov. 30, 1971 to Witt, the disclosure of which is hereby incorporated by reference.

The catalyst of this invention is particularly suitable for use in slurry polymerizations. The slurry process is generally carried out in an inert diluent (medium) such as a paraffin, cycloparaffin or aromatic hydrocarbon. For predominantly ethylene polymers, a temperature of about 66°–110° C. is employed. Pressures in the particle form process can vary from about 110 to about 700 psia (0.76–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Generally in slurry polymerization of ethylene homopolymer or predominantly ethylene copolymer systems, the feasible temperature range is 150°–230° F. (66°–110° C.).

In polymerizations using a catalyst according to the second aspect of this invention, the chromium compound and the support can be added separately to the reactor. Alternatively, in some instances, particularly in large, continuously run reactors, it may be desirable to briefly premix support and chromium compound in inert diluent such as n-hexane and charge the mixture intermittently as required to sustain the polymerization reaction at the desired rate.

Catalyst (chromium compound + support) concentrations can be such that the catalyst content ranges from 0.001 to about 1 weight percent based on the weight of the reactor contents.

When hydrogen is used in the prior art, it is generally used at pressures up to 120 psia (0.8 MPa), preferably within the range of 20 to 70 psia (0.01 to 0.48 MPa). Similar amounts can be used in accordance with this invention although smaller amounts are sometimes preferred with the organochromium because of the sensitivity of this catalyst system to the effects of hydrogen. Stated in terms of mole percent hydrogen based on moles of diluent the hydrogen concentration can be from about 0.1 to 10, preferably about 0.2 to 1.25 mole percent, most preferably about 1 mole percent.

Supports employed in the Examples include for the control runs Davison 952 silica and $AlPO_4$ made according to U.S. Pat. No. 4,364,841. For the invention runs Davison HPV (high pore volume) $Al_2O_3$ and Ketjen B $Al_2O_3$ were used.

EXAMPLE 1

Catalysts Containing Octakis-($\mu$-trimethylsilymethyl)tetrachromium(II) and Ethylene Polymerization A series of supports was made from a commercially available, particulate grade alumina, from Davison described as high pore volume (HPV) alumina having a surface area of about 530 $m^2/g$ and a pore volume of about 2.7 cc/g (B.E.T.) After treatment each portion of alumina used was calcined for 3 hours in dry air at 600° C.

Control catalyst A consisted of the calcined, unmodified alumina used in conjunction with 0.1 mmole of octakis-($\mu$-trimethylsilylmethyl)tetrachromium(II), abbreviated $Cr_4(TMS)_8$, per gram of support. The $Cr_4(TMS)_8$, a novel compound was made as disclosed in Example 13.

Invention catalyst B consisted of a silicated alumina and the same level of $Cr_4(TMS)_8$ as in catalyst A. The alumina was silicated using a methanolic solution of Silbond 40® to give 3.2 weight percent $SiO_2$ as described hereinbelow with catalyst D.

Invention catalyst C consisted of a fluorided alumina and the same level of $Cr_4(TMS)_8$ per gram support as for catalyst A. The fluorided support was prepared by impregnating the alumina with a sufficient amount of $NH_4HF_2$ in excess methanol to provide 1.5 weight percent combined fluorine, calculated as F, in the dry composite. Following impregnation, the mixture was dried in a vacuum oven at 80° C. for 12 hours. The product was sieved through a 35 mesh screen and a portion was calcined at 600° C. as before to obtain the modified support.

Invention catalyst D consisted of a fluorided, silicated alumina used in conjunction with $Cr_4(TMS)_8$ at the same level as for catalysts A and B. The modified support was prepared by admixing the alumina with a methanolic solution of $NH_4HF_2$ and with Silbond 40® sufficient to provide 1.5 weight percent F and 3.2 weight percent $SiO_2$ based on the dry composite. After drying as before the product was sieved and calcined in the manner described above.

Ethylene was polymerized in a 2 liter stirred stainless steel reactor at 95° C. using a 30 mg portion of each support and the proper amount of Cr$_4$(TMS)$_8$ as noted earlier. The Cr$_4$(TMS)$_8$ was injected separately into the reactor already charged with the support. The reactor contained 1.25 lbs. (567 g) of isobutane as diluent. Each run was conducted for 1 hour for catalysts A and B and 30 minutes each for catalysts C and D at a total reactor pressure (diluent plus ethylene) of about 565 psia. This pressure was maintained by supplying ethylene as needed from a pressurized reservoir.

It was found that control catalyst A produced polyethylene at a calculated rate of 270 g polymer per g support per hour. Polymer properties were not determined.

Invention catalyst B produced polymer at a rate 800 g/g/hr.

Invention catalyst C, in contrast, produced polyethylene at a calculated rate of 12,000 g polymer per g support per hour. The polymer had a high load melt index (HLMI) of 1.4 g/10 minutes as determined in accordance with ASTM D 1238, condition F.

Invention catalyst D, produced polyethylene at a calculated rate of 13,500 g polymer per g support per hour, having a HLMI of 0.4 g/10 minutes.

It is clearly the modifying of the alumina by the fluorine and fluorine plus silica that is responsible for the pronounced increase in catalyst activity although just the silicating treatment results in some improvement. The results are summarized in Table I.

TABLE I

| Catalyst | | Calculated Productivity g/g/hr |
|---|---|---|
| A control | Al$_2$O$_3$ | 270 |
| B invention | Si—Al$_2$O$_3$ | 800 |
| C invention | F—Al$_2$O$_3$ | 12,000 |
| D invention | F—Si—Al$_2$O$_3$ | 13,500 |

EXAMPLE 2

Bis(Cyclopentadienyl)Chromium II (Chromocene) Catalyst and Ethylene Polymerization A pair of catalysts was made by impregnating the specified dry, calcined support with a solution of bis(cyclopentadienyl)chromium (II) dissolved in a paraffin, e.g. n-heptane, sufficient to add 2 weight percent chromium, based on the dry composite. The supports employed included high pore volume alumina and the same alumina impregnated with 3.0 weight percent SiO$_2$ and 1.5 weight percent F, both dried and calcined for 3 hours at 700° C. in dry air.

A portion of each catalyst was employed in ethylene polymerization as before. The results are presented in Table II.

TABLE II

| | | Calculated | | Polymer | | | |
|---|---|---|---|---|---|---|---|
| Run No. | Support | Productivity g/g cat/40 min. | Run Time Min. | Yield g | Intrinsic[b] visc., dl/g | Density[c] g/cc | Remarks |
| 1 | Alumina | 300[a] | 60 | 18 | — | — | control |
| 2 | F-Si-Alumina | 3170 | 40 | 204 | 27 | 0.9257 | invention |

[a] Actual run time was 60 minutes, giving a calculated productivity for that time of 500 g polymer per g catalyst. Assuming a linear response with time the calculated productivity for 40 minutes is 500 × 40 divided by 60 to give 330.
[b] Intrinsic viscosity was determined in accordance with ASTM D-4020-81, modified by using 0.015 wt. % dissolved polymer rather than 0.05 wt. %. The change is made to obtain better dissolution of the polymer, which can be difficult to dissolve. Currently, ultrahigh molecular weight polyethylene, UHMWPE, is defined as one having an intrinsic viscosity of about 20 or higher.
[c] ASTM D-1505.

The low productivity results in Table II, run 1 show that bis(cyclopentadienyl)chromium on unmodified alumina, control run 1, gives a relatively inactive catalyst. Invention catalyst run 2 is much more active, and ultrahigh molecular weight polyethylene was made.

EXAMPLE 3

Silicated Alumina-Hexavalent Cr Catalysts and Ethylene Polymerization

A series of catalysts containing high pore volume alumina with a surface coating of SiO$_2$ was prepared by impregnating the Al$_2$O$_3$ in methanol with sufficient Silbond 40 ® organosilicate solution and with sufficient hydrated chromium salt (Cr(NO$_3$)$_3$.9H$_2$O or Cr(C$_2$H$_3$O$_2$)$_3$.H$_2$O) to provide compositions each containing 2.0 weight percent hexavalent Cr (as the oxide) and with varying amounts of SiO$_2$, all calculated amounts based on the vacuum dried and calcined products. Each composition was activated by calcining in dry air for 3 hours at 700° C.

Ethylene polymerization was carried out in the manner previously described in the presence of 1.0 cc triethylborane (TEB), 0.5 weight percent in n-hexane, equivalent to about 8 ppm TEB, based on the weight of isobutane diluent, as cocatalyst and a weighted amount of the activated catalyst. In this series, catalyst weights ranged from about 0.05 to about 0.15 g.

The conditions used and results obtained are given in Table III.

TABLE III

Ethylene Polymerization With Cr$^{+6}$-Silicated Al$_2$O$_3$ Catalyst and TEB Cocatalyst, 565 PSIA Total Pressure

| Run No. | Calculated Wt. % | | Reaction Temp. °C. | Reaction Time, min. | Calculated Productivity g/30 min. | Polymer | | |
|---|---|---|---|---|---|---|---|---|
| | SiO$_2$ | Cr | | | | Yield g | HLMI | Melt Visc., MPoise |
| 1 | 2.5 | 2.0 | 85 | 30 | 1770 | 146 | 0 | 38 |
| 2 | 2.7 | 2.0 | 85 | 45 | 750(1130)[a] | 108 | 0 | — |
| 3 | 5.4 | 2.0 | 95 | 30 | 1100 | 105 | 0 | — |
| 4 | 8.0 | 2.0 | 95 | 30 | 2330 | 248 | 0 | — |
| 5 | 8.0 | 2.0 | 95 | 20 | 2080(1390)[b] | 213 | 0 | — |

TABLE III-continued

Ethylene Polymerization With $Cr^{-6}$-Silicated $Al_2O_3$ Catalyst and TEB Cocatalyst, 565 PSIA Total Pressure

| Run No. | Calculated Wt. % SiO₂ | Cr | Reaction Temp. °C. | Reaction Time. min. | Calculated Productivity g/30 min. | Polymer Yield g | HLMI | Melt Visc., MPoise |
|---|---|---|---|---|---|---|---|---|
| 6 | 13.3 | 2.0 | 95 | 20 | Dead | 2.3 | — | — |
| 7(c) | 5.4 | 2.0 | 95 | 30 | 2000 | 148 | — | — |
| 8(d) | 0 | 1.0 | 96 | 60 | 250(500)(e) | 46 | — | — |

(a)Normalized to 30 minutes from the 45 minute run time assuming a linear relationship over the time period, e.g. productivity per 30 minutes is obtained by $$\frac{1130 \cdot 30}{45} = 750 \text{ g.}$$

(b)Normalized to 30 minutes from the 20 minute run time assuming a linear relationship over the time period as in footnote (a), e.g. productivity per 30 minutes:

$$\frac{1390 \cdot 30}{20} = 2080 \text{ g.}$$

(c)The catalyst was prepared by impregnating the alumina, precalcined for 3 hours at 700° C., with the Silbond 40 solution.
(d)Control catalyst made by aqueously impregnating HPV alumina with sufficient CrO₃ to provide 1 wt. % Cr on the calcined catalyst. Catalyst activated (calcined) in dry air for 3 hours at 700° C.
(e)Normalized to 30 minutes from the 60 minute run time assuming a linear relationship over the time period as in footnote (a), e.g. productivity per 30 minutes:

$$\frac{500 \cdot 30}{60} = 250 \text{ g.}$$

The control catalyst in run 8 of Table III produced about 250 g per 30 minutes, a typical result obtained with hexavalent Cr on unmodified alumina.

Inspection of the data in invention runs 1–7 of Table III show that active catalysts were made in each instance. Catalysts containing about 8 weight percent silica, runs 4, 5, were the most active.

In comparing productivity results in runs 3 and 7, each catalyst containing about 5.4 weight percent silica, it is apparent that precalcining the alumina before admixing the silica (run 7) gives a more active catalyst, e.g. productivity is about double that in run 3, than adding the silica to alumina containing volatiles (wet).

Melt viscosity data are obtained by means of a Rheometrics Dynamic Spectrometer at 230° C. using parallel plate geometry. Strain amplitude is 5 percent, nitrogen is used in the sample chamber and the oscillatory frequency is varied from 0.1 to 500 radians/second. The data obtained give storage modulus and loss modulus as a function of oscillatory frequency. From these data in turn can be calculated dynamic complex viscosity /η*/ as described in Chapter 1 of the "Viscoelastic Properties of Polymers", by Ferry, published in 1961 by Wiley. The values obtained are directly related to polymer molecular weight, with the higher the value the higher the molecular weight. It has been shown for a commercially available ultra high molecular weight polyethylene (UHMWPE) that /η*/ when determined at 0.1 radian/second and 190° C. has a value of about 30 MPoise.

The polymer produced in invention run 1 can be classed as UHMWPE since it has a melt viscosity of 38 MPoise.

EXAMPLE 4

Fluorided Alumina-Hexavalent Cr Catalysts and Ethylene Polymerization

A series of catalysts containing combined fluorine and high pore volume alumina was prepared by impregnating the alumina with a methanolic solution of $Cr(NO_3)_3.9H_2O$ sufficient to provide a calculated 1.5 weight percent Cr based on the dry catalyst, drying the mixture and impregnating same with a methanolic solution of $NH_4HF_2$ sufficient to give the specified amount of combined fluorine as weight percent based on the dry catalyst. Each catalyst was activated for polymerization by calcining in dry air at the specified time and temperature.

Control run 8, Table III, is repeated as a control in this example.

Ethylene was polymerized with portions of each catalyst and with 8 ppm TEB as cocatalyst in the same manner as in Example 3 at 85° C.

The conditions used and results obtained are set forth in Table IV.

TABLE IV

Ethylene Polymerization With $Cr^{-6}$-Fluorided $Al_2O_3$ Catalyst and TEB Cocatalyst, 565 PSIA Total Pressure

| Run No. | Calculated Wt % F | Calcining Temp. °C. | Hours | Reaction Temp. °C. | Reaction Time, Min. | Calculated Productivity g/30 min. | Polymer Yield g | HLMI g/10 min |
|---|---|---|---|---|---|---|---|---|
| 8 (Table III) | 0 | 700 | 3 | 96 | 60 | 250 | 46 | — |
| 1 | 1.7 | 700 | 3 | 85 | 30 | 1230 | 110 | 0 |
| 2 | 2.0 | 700 | 3 | 85 | 32 | 950(1013)(a) | 85 | 0 |
| 3 | 2.3 | 600 | 3 | 85 | 30 | 1365 | 105 | 0 |
| 4 | 2.7 | 700 | 1 | 85 | 25 | 2730(1820)(a) | 137 | 0 |
| 5 | 3.4 | 600 | 3 | 85 | 30 | Trace | — | — |

(a)Normalized to 30 minute run time as described under footnotes a, b, e in Table III. The values in the brackets are calculated productivity for the actual run times.

The results for invention runs 1–4, of Table IV all show that fluoriding alumina gives more active catalysts based on productivity results compared to the results obtained in the control run 8. That is, productivity is increased from about 3.8 to 8.7-fold by the fluoriding treatment, with the catalyst containing about 2.7 weight percent combined fluorine being the most active. Ultra high molecular weight polymer, having a melt viscosity of 40 to 50 was obtained.

Run 1 further shows that very small amounts of F are effective. Run 5 shows that above 3 weight percent F there is a dramatic deterioration in catalyst activity. Depending on other factors such as surface area, it is believed that 5 percent is the most that would possibly be beneficial, with 3 percent generally being the upper limit.

EXAMPLE 5

Silicated, Fluorided Alumina-Hexavalent Cr Catalysts And Ethylene Polymerization A series of catalysts containing combined fluorine, silica and high pore volume alumina was prepared by impregnating the alumina with Silbond 40® as the silica source $(NH_4)_2SiF_6$ or $NH_4HF_2$ as the fluoride source and $Cr(C_2H_3O_2)_3 \cdot H_2O$ or $Cr(NO_3)_3 \cdot 9H_2O$ as the Cr source in the manner described before. Each mixture was then dried and activated (calcined) for polymerization by heating in dry air for the specified time.

Ethylene was polymerized, as before, with portions of each catalyst and with 8.3 ppm TEB or TEA (triethylaluminum, one instance) as cocatalyst, and in one run, in the presence of 5 cc of 1-hexene and hydrogen.

The conditions used and results obtained are presented in Table V.

outlined before. In one instance, the alumina was treated with Silbond 40® and $Cr(NO_3)_3 \cdot 9H_2O$ in the presence of isopropanol and the mixture dried overnight in a vacuum oven at 80° C. The next day the solid product was mixed with $NH_4HF_2$ and methanol and that product dried in a vacuum oven as before. The dry product was activated (calcined) in dry air for 3 hours at 700° C. to give invention catalyst L.

In the second instance, all the catalytic components employed in invention catalyst L were mixed together in the presence of methanol, dried in a vacuum oven and calcined as above to form invention catalyst M.

Each catalyst, on a dry basis (calcined) was calculated to contain about 4 weight percent silica, about 2.1 weight percent each of chromium and fluorine, the balance being alumina.

A portion of each catalyst was mixed with another conventional catalyst consisting of 1 weight percent hexavalent chromium on aluminum phosphate, P/Al atom ratio of 0.9, the catalyst being activated for 3 hours at 700° C. in dry air. This catalyst is called O, for convenience.

Ethylene alone and in some instances ethylene ad-

TABLE V

Ethylene Polymerization With $Cr^{+6}$-Silicated, Fluorided $Al_2O_3$ Catalyst, TEB Or TEA Cocatalyst, 565 PSIA Total Pressure

| Run No. | Calculated, Wt. % | | | Temp., °C. | | Run Time min. | Calc. Prod. g/30/min. | Polymer | | |
|---|---|---|---|---|---|---|---|---|---|---|
| | $SiO_2$ | F | Cr | Act. | Reaction | | | Yield g | HLMI | Melt visc. MPoise |
| 1(a) | 0 | 0 | 2.0 | 700 | 96 | 60 | 250 | 46 | —(b) | — |
| 2 | 1.0 | 1.8 | 1.5 | 600 | 85 | 30 | 945 | 135 | 0 | 43 |
| 3 | 1.3 | 2.6 | 1.5 | 600 | 85 | 30 | 2000 | 140 | 0 | 54 |
| 4(c) | 1.3 | 2.6 | 1.5 | 600 | 100 | 25 | 900(750) | 35 | 0.8 | — |
| 5(d) | 1.6 | 3.2 | 1.5 | 600 | 85 | 20 | 120(80)(f) | 8 | — | — |
| 6 | 2.5 | 2.0 | 2.0 | 700 | 85 | 30 | 2410 | 170 | 0 | 55 |
| 7(e) | 4.0 | 2.2 | 1.5 | 700 | 85 | 30 | 1440 | 105 | 0 | 39 |
| 8 | 4.0 | 2.2 | 1.5 | 750 | 85 | 30 | 1300 | 98 | 0 | — |
| 9 | 2.5 | 2.7 | 1.5 | 700 | 85 | 30 | 1015 | 150 | 0 | — |
| 10 | 3.2 | 2.2 | 4.0 | 700 | 85 | 30 | 2100 | 160 | 0 | — |
| 11 | 4.8 | 2.2 | 1.5 | 700 | 85 | 30 | 2380 | 129 | 0 | — |

(a) Same as Run 8, Table III.
(b) A dash signifies no determination was made.
(c) Run made with 5.0 cc 1-hexene and 50 psi $H_2$. The calculated productivity is normalized to 30 minutes run time as in previous tables. The value in brackets is 750 g/25 minutes run time.
(d) Calculated productivity is normalized to 30 minutes run time. The value in brackets is 80 g/20 minutes run time.
(e) Used 8.3 ppm TEA as cocatalyst. All other runs made with 8.3 ppm TEB as cocatalyst.
(f) Apparently the catalyst was accidentally deactivated.

Inspection of the results set forth in Table IV shows that the invention catalysts in runs 2–11 are active in polymerizing ethylene to very high molecular weight homopolymers in the absence of hydrogen based on the zero HLMI results. The melt viscosity values of 43, 54, 55 and 39 megapoise shown in runs 2, 3, 6, and 7 are considered to be indicative of ultrahigh molecular weight polyethylene. The catalyst is also rather insensitive to hydrogen as shown in run 4 since the HLMI of the ethylene/1-hexene copolymer made is 0.8. This value is indicative of a high molecular weight polymer. The low productivity of 120 g polymer per g catalyst per 30 minutes is believed to be an anomalous result. The catalyst was apparently deactivated, perhaps inadvertently contacting a poison during its production or in the polymerization process.

EXAMPLE 6

Production Of Ethylene Polymers In Scaled-Up Runs With Silicated, Fluorided Alumina-Hexavalent Chromium Catalyst Alone and in Admixture With Hexavalent Chromium-Aluminum Phosphate Catalyst Several silicated, fluorided high pore volume alumina-hexavalent Cr catalysts were prepared in the manner mixed with 1-hexene was polymerized in a 23 gal (87 liter) loop reactor in a continuous process at the specified temperatures employing isobutane as diluent, triethylborane (TEB) as cocatalyst and the indicated amount of hydrogen as adjuvant. In this process, catalyst was intermittently charged as a slurry in n-hexane at a rate sufficient to maintain the desired production of polymer. The product in slurry form was intermittently removed from the reactor through a settling leg, flashed to remove diluent and volatile gases and stored. The resulting "fluff" was stabilized with a conventional multicomponent system sufficient to provide about a total of 0.2 weight percent stabilizers, e.g. 2,6-di-t-butyl-4-methylphenol, dilauryl thiodipropionate, zinc stearate, prior to evaluating it for various physical properties.

The catalyst systems, reaction conditions and results obtained are set forth in Table VI and VIA.

TABLE VI

| | | | Ethylene Polymerization. Single Catalyst. No Hydrogen | | | | | |
|---|---|---|---|---|---|---|---|---|
| | | | Calculated | | Polymer | | | |
| | | | Productivity | Reactor | Density, g/cc | | Intrinsic | Melt Viscosity |
| Run No. | Cat No. | TEB ppm | g/g cat/hr. | Temp., °C. | Fluff[a] | Molded | Visc. dl/g | MPoise |
| 1 | L | 1 | 1330 | 93 | 0.474 | 0.9402 | 16 | —[b] |
| 2 | L | 2 | 1590 | 93 | 0.468 | 0.9401 | 15 | — |
| 3 | M | 3 | 2500 | 93 | 0.450 | 0.9412 | 14 | 34 |
| 4 | M | 1 | 1320 | 83 | 0.474 | 0.9414 | — | 49 |
| 5 | M | 4 | 1650 | 82 | 0.482 | 0.9402 | 16.5 | 52 |
| 6 | M | 4 | 1740 | 82 | 0.461 | 0.9403 | insoluble | 53 |
| 7 | M | 4 | 1920 | 87 | 0.471 | 0.9400 | insoluble | 54 |
| 8 | M | 4 | 2040 | 88 | 0.460 | 0.9408 | insoluble | 47 |
| 9 | M | 4 | 1450 | 88 | 0.455 | 0.9398 | 11.6 | 29 |

[a] Bulk density.
[b] A dash signifies no determination made.

| | Ethylene Polymerization. Mixed Catalyst. With Hydrogen | | | | | | | | | | |
|---|---|---|---|---|---|---|---|---|---|---|---|
| | Mixed Catalyst | | Calculated | H$_2$ | | | Reactor | Polymer | | Flex[a] | ESCR |
| | Component | Component | Prod. | Mole | 1-Hexene | TEB | Temp. | Density g/cc | | Pellet | Mod. | Cond. |
| Run No. | L, Wt % | O, wt % | g/g/hr | % | Wt % | ppm | °C. | Fluff[b] | Molded | HLMI | MPa | A |
| 10 | 79 | 21 | 1450 | 1.00 | 0 | 0.51 | 97 | 0.404 | 0.9580 | 6.7 | 1450 | >1000 |
| 11 | 79 | 21 | 1280 | 1.23 | 0 | 0.79 | 99 | 0.420 | 0.9586 | 16 | 1450 | >1000 |
| 12 | 79 | 21 | 1750 | 0.85 | 0 | 1.03 | 99 | 0.428 | 0.9594 | 23 | 1410 | >1000 |
| 13 | 79 | 21 | 1850 | 0.50 | 0 | 1.01 | 99 | 0.415 | 0.9590 | 14 | 1430 | >1000 |
| 14 | 79 | 21 | 1610 | 0.33 | 1.6 | 1.06 | 99 | 0.426 | 0.9577 | 20 | 1390 | >1000 |
| 15 | 67 | 33 | 1750 | 0.16 | 3.6 | 1.12 | 93 | 0.439 | 0.9551 | 42.5 | 1280 | >1000 |
| 16 | 67 | 33 | 1640 | 0.09 | 3.5 | 1.08 | 91 | 0.431 | 0.9540 | 23 | 1190 | >1000 |
| 17 | 67 | 33 | 2170 | 0.13 | 2.9 | 1.06 | 86 | 0.392 | 0.9561 | 15 | 1260 | >1000 |

[a] ASTM D-790.
[b] Bulk density.

The results presented in Table VI show in runs 1-3, at a constant reactor temperature that productivity increases with increasing TEB level, bulk density decreases, molded density remains about the same and polymer molecular weight is decreasing based on intrinsic viscosity data. Although, the intrinsic viscosity results are less than 20, except for runs 6-8 where the polymer was too high molecular weight to dissolve, the melt viscosity results suggest that UHMWPE is made in all the runs, thus all are considered to be invention runs. At a constant TEB level of 4 ppm the results in runs 5-8 indicate that as reactor temperatures increase, productivity also increases and polymer bulk density decreases although little change in molded density is seen. The productivity results obtained are sufficiently high to be of commercial interest.

Table VIA shows the results of ethylene homopolymers and ethylene/1-hexene copolymers prepared with catalyst mixtures containing the invention catalysts. These bimodal homopolymers prepared in runs 10-13 have a higher density than those listed in Table V, reflecting the influence of the AlPO$_4$-containing catalyst. As TEB level increases in these runs, productivity also increases as before. All polymers show pellet (pelletized fluff) HLMI values ranging from about 7 to 43, and outstanding ESCR for the high stiffness, indicating that good film could be produced from at least some of them, e.g. those having a HLMI of about 20 or less. As expected, with decreasing density, the flexural moduli of the polymer samples also decrease.

EXAMPLE 7

Phosphated, Silicated, Fluorided Alumina-Hexavalent Cr Catalysts And Ethylene Polymerization A series of catalysts was prepared by impregnating high pore volume alumina slurried in methanol with a methanolic solution of 85% H$_3$PO$_4$ sufficient to provide the desired calculated quantity of phosphorus. Additionally, in the invention catalysts sufficient NH$_4$HF$_2$ dissolved in methanol, sufficient Silbond 40, and sufficient Cr(NO$_3$)$_3$.9H$_2$O were also added to provide the desired calculated amounts of combined fluorine, SiO$_2$ and chromium, all based on the dry composites. Each mixture was dried in a vacuum oven at 80° C. and activated in (calcined) dry air at 700° C., unless specified otherwise, for 3 hours.

A portion of each activated catalyst was then tested in ethylene polymerization with 8 ppm TEB as cocatalyst as described in Example 2.

The conditions used and the results obtained are set forth in Table VII.

TABLE VII

| | Ethylene Polymerization With Phosphated, Silicated, Fluorided Alumina-Hexavalent Cr Catalyst, TEB Cocatalyst, 565 PSIA Total Pressure | | | | | | | | | |
|---|---|---|---|---|---|---|---|---|---|---|
| | Catalyst | | | | | | | Calculated | | |
| | Mole Ratio | Calculated Wt. % | | | Temp. °C. | | Run Time | Productivity | Polymer | |
| Run No. | P/Al | Cr | F | SiO$_2$ | Act. | Run | Min. | g/30 min. | Yield g | HLMI 5/10 min. |
| 1[a] | (b) | 1 | — | — | 700 | 96 | 60 | 250 | 46 | — |
| 2[c] | — | 2 | 2.0 | 2.5 | 700 | 85 | 30 | 2410 | 170 | 0 |
| 3[d] | — | 1 | 2.2 | 4.0 | 700 | 85 | 30 | 1300 | 98 | 0 |
| 4[e] | 0.10 | 2 | — | — | 700 | 95 | 46 | 620(955)[f] | 37 | 1.0 |
| 5[e] | 0.18 | 2 | — | — | 700 | 95 | 30 | 2350 | 329 | 0.70 |
| 6 | 0.05 | 2 | 2.2 | 3.2 | 700 | 85 | 30 | 2420 | 200 | 0 |
| 7 | 0.05 | 1 | 2.2 | 1.2 | 600 | 96 | 30 | 2400 | — | 0 |
| 8 | 0.10 | 2 | 2.2 | 1.2 | 700 | 85 | 30 | 2340 | 100 | >0. >0.1 |

TABLE VII-continued

Ethylene Polymerization With Phosphated, Silicated, Fluorided
Alumina-Hexavalent Cr Catalyst, TEB Cocatalyst, 565 PSIA Total Pressure

| | Catalyst | | | | | | Calculated | | |
| | Mole Ratio | Calculated Wt. % | | | Temp. °C. | Run Time | Productivity | Polymer | |
| Run No. | P/Al | Cr | F | SiO$_2$ | Act. Run | Min. | g/30 min. | Yield g | HLMI 5/10 min. |
|---|---|---|---|---|---|---|---|---|---|
| 9$^{(g)}$ | 0.10 | 2 | 2.2 | 1.2 | 700 102 | 60 | 860(1720)$^{(f)}$ | 105 | 2.7 |
| 10 | 0.10 | 2 | 2.0 | 1.2 | 700 85 | 30 | 2400 | 150 | >0, >0.1 |
| 11 | 0.20 | 2 | 2.0 | 1.2 | 700 85 | 30 | 3520 | 324 | 0.17 |
| 12 | 0.20 | 2 | 2.0 | 1.2 | 700 85 | 40 | 1950(2600)$^{(f)}$ | 170 | 1.6 |
| 13 | 0.10 | 2 | 2.0 | 1.2 | 600 95 | 60 | 1170(2340)$^{(f)}$ | 121 | 3.5 |
| 14 | 0.10 | 2 | 2.2 | 3.2 | 600 95 | 30 | 2200 | — | >0.1 |
| 15$^{(h)}$ | 0.10 | 1.5 | 2.0 | 1.2 | 700 95 | 30 | 2900 | — | 1.1 |

$^{(a)}$Control, same as Run 8, Table III.
$^{(b)}$Not applicable, or not determined.
$^{(c)}$Comparison, same as Run 6, Table V, i.e. invention run but without the phosphate.
$^{(d)}$Comparison, same as Run 8, Table V, i.e. invention run but without the phosphate.
$^{(e)}$Prior art support shown for comparison.
$^{(f)}$Normalized to 30 minutes run time as described in earlier tables. The values in the brackets are calculated productivities for the actual run times.
$^{(g)}$Run made with 5.0 cc 1-hexene and 50 psi hydrogen.
$^{(h)}$Run made with 50 psi hydrogen.

Inspection of the results given in Table VII reveal that the alumina-supported hexavalent Cr catalysts can be fine-tuned to produce polymer in the desired high load melt index range, ranging from zero (UHMW) to about 4, or higher, by treating the support with one or more of the chemical agents described before. Without any chemical treatment, Cr$^{+6}$ on alumina is seen in control run 1 to be a low activity ethylene polymerization catalyst. Comparison runs 2, 3 show that Cr$^{+6}$ on a fluorided, silicated alumina give active catalysts capable of producing UHMWPE, e.g. HLMI is zero. Comparison runs 4, 5 show that Cr$^{+6}$ on phosphated alumina yield active catalysts that are capable of producing lower molecular weight polymer, e.g. HLMI of about 1, than the UHMWPE of runs 2, 3. The remaining invention runs 6–15 show, when hydrogen is absent, that Cr$^{+6}$ on a phosphated, fluorided, silicated alumina give catalysts that can be more active than the comparison catalysts, e.g. invention run 11, having a productivity of about 3500 g polymer per g catalyst per 30 minutes, and the polymers have HLMI values generally intermediate those of polymers made with the fluorided, silicated aluminas, e.g. zero HLMI and polymers made with just phosphated alumina, e.g. HLMI of about 1.

When hydrogen is employed in the reactor as a molecular weight modifier, lower HLMI polymers are made, e.g. invention runs 9, 12, 15, which have values ranging from about 1.5 to 3.5.

Thus while the prior art run 5 is as good or better than some of the "comparison" invention runs so far as productivity is concerned, the inventive phosphated catalysts gives further flexibility in molecular weight control and overall best results as shown by run 11.

EXAMPLE 8

Alumina-Aluminum Phosphate Catalysts (Pore Cogel)

A series of catalysts was prepared by contacting the previously described high pore volume alumina, modified (as described in the previous examples) by the addition of ammonium bifluoride, silica, and orthophosphoric acid (when employed) with a conventionally prepared AlPO$_4$ syrup. The contacting can be done by gelling the AlPO$_4$ in the pores of the modified alumina. For example, a concentrated solution containing the desired amounts of Al(NO$_3$)$_3$.9H$_2$O, NH$_4$H$_2$PO$_4$ and Cr(NO$_3$)$_3$.9H$_2$O dissolved in water was prepared. It was then added with mixing to the modified alumina and adsorbed into its pores leaving a seemingly dry powder. The amount of syrup must be equal to or less than the pore volume of the modified alumina. Ammonium hydroxide was then added, causing the syrup to set up into a gel within the pores of the alumina base catalyst. The syrup can also be gelled by adding ammonium carbonate solution to form AlPO$_4$ gel. The resultant composite (or pore cogel) can be washed with water, then alcohol and isolated by filtration. The product is then dried in a vacuum oven and activated for polymerization by calcining in dry air at elevated temperature. In an alternate procedure, the modified alumina can be sprayed with the syrup containing the AlPO$_4$ gel.

In all instances, the mixed catalysts, after isolation and drying, were calcined for 3 hours in dry air at 700° C., cooled, and stored in a nitrogen atmosphere as before.

A description of the modified alumina, the calcining temperature employed after the modification, the calculated atom ratios of Al:P in the AlPO$_4$ employed, the calculated weight ratios (dry basis) of modified alumina base to AlPO$_4$ base, and the calculated total chromium (dry basis) of the mixed catalyst systems are set forth in Table VIII.

TABLE VIII

Pore Cogel Catalyst Details

| | Modified Alumina Base | | | | | AlPO$_4$ Base | | | |
| | Wt. % | | | Al/P | Calcining | P/Al | Wt. % | Calculated Wt. Ratio | |
| Cat No. | F | Cr | SiO$_2$ | Atom Ratio | Temp. °C. | Atom Ratio | Cr | Al$_2$O$_3$ Cat: AlPO$_4$ Cat | Total Cr Wt. % |
|---|---|---|---|---|---|---|---|---|---|
| 1 | 2.1 | 0 | 3.7 | 0 | 500 | 0.8 | 1.9 | 3.8:1 | 0.5 |
| 2 | 2.1 | 0 | 3.7 | 0 | 500 | 0.8 | 1.9 | 3.8:1 | 0.5 |
| 3 | 2.1 | 0 | 3.7 | 0 | 500 | 0.8 | 4.9 | 1.7:1 | 1.8 |
| 4 | 2.1 | 0 | 3.7 | 0 | 500 | 0.9 | 3.1 | 1.7:1 | 1.1 |
| 5 | 1.9 | 0.9 | 2.8 | 0.025 | 600 | 0.9 | 3.2 | 1.9:1 | 1.7 |

TABLE VIII-continued

| | | | Pore Cogel Catalyst Details | | | | | |
|---|---|---|---|---|---|---|---|---|
| | Modified Alumina Base | | | | AlPO₄ Base | | | |
| | Wt. % | | | Al/P | Calcining | P/Al | Wt. % | Calculated Wt. Ratio | |
| Cat No. | F | Cr | SiO₂ | Atom Ratio | Temp. °C. | Atom Ratio | Cr | Al₂O₃ Cat: AlPO₄ Cat | Total Cr Wt. % |
| 6 | 1.8 | 2.3 | 2.7 | 0.025 | 600 | 0.9 | 3.2 | 2.1:1 | 2.7 |

EXAMPLE 9

Ethylene Polymerization With Mixed Catalysts Of Example 8

Ethylene was polymerized with a portion of each catalyst in the manner employed in Example 4 at 96° C., 8.3 ppm TEB as cocatalyst and 50 psi hydrogen as adjuvant, unless specified otherwise.

The results are presented in Table IX.

With these dual function "pore cogel" catalyst composites one obtains an intimate bimodal mixture of high and low MW polymer without expensive blending of polymers later. Such polymers are valuable in film and blow molding applications.

EXAMPLE 10

To illustrate the difference in the nature of ethylene polymers made with catalysts comprising hexavalent chromium on treated alumina and hexavalent chromium on similarly-treated silica and silica-alumina a series of catalysts was made with the silica supports.

The silica employed was Davison 952 grade having a surface area of about 300 m²/g and a pore volume of about 1.6 cc/g. The silica-alumina was Davison grade MS 13-11D consisting of 87 weight percent silica and 13 weight percent Al₂O₃. It has a surface area of about 300 m²/g and a pore volume of about 1.1 cc/g. Each support was impregnated with sufficient aqueous solution

TABLE IX

| | | Ethylene Polymerization With Mixed Catalysts containing Hexavalent Chromium | | | | | | |
|---|---|---|---|---|---|---|---|---|
| Run No. | Mixed Cat. No. | Run Time Min. | Calculated Productivity g/30 min. | H₂ Used | Polymer | | | ESCR COND. A |
| | | | | | Density g/cc | Flex Mod. MPa | HLMI g/10 min | |
| 1P | 1 | 13(a) | 4850 | no | —(b) | — | <0.1 | >1000 |
| 2P | 2 | 50(a) | 1430(c) | yes | — | — | 2.7 | >1000 |
| 3P | 3 | 20 | 3600 | yes | 0.9637 | 1610 | 11 | >1000 |
| 4P | 4 | 20(a) | 4290 | yes | 0.9633 | 1520 | 41 | >1000 |
| 5P | 5 | 30 | 4000 | yes | 0.9645 | 1510 | 21 | >1000 |
| 6P | 6 | 30 | 4800 | yes | 0.9656 | 1530 | 63 | >1000 |

(a)For run times other than 30 minutes, the productivities are normalized to 30 minutes as described in earlier tables.
(b)A dash signifies no determination made.
(c)A polymerization temperature of 100° C. was employed. However, total reactor pressure of 565 psia was employed as in all the other runs. This means, in view of the higher diluent partial pressure, that less ethylene partial pressure was required to obtain 565 psia.

The results obtained in Table IX show that high density homopolymers can be prepared with the mixed or "pore cogel" catalysts, over a relatively wide range of molecular weight as evidenced by HLMI. As the amount of AlPO₄-based catalyst decreases the density of the polymers increases in this series. The depressing effect of hydrogen on productivity can be seen by comparing the high productivity results obtained in run 1 with the lower results obtained in run 2. In the presence of hydrogen, lower molecular weight polymers are obtained as can be noted in runs 2P–6P where HLMI values are obtained ranging from about 3 to 63 whereas in run 1P a value less than 0.1 is shown. All samples had an excellent combination of ESCR and stiffness.

of Cr(NO₃)₃ to provide a calculated 1 weight percent chromium as chromium oxide based on the finished, activated composite.

In addition, each silica support like previous alumina supports, was treated with sufficient NH₄F₂, Silbond ® 40 and Cr(NO₃)₃ in the manner previously described to provide finished, activated composites, each containing a calculated 1 weight percent chromium as chromium oxide, 2 weight percent F and 3.7 weight percent added SiO₂.

Each catalyst was employed in ethylene polymerization in a batch reactor at a total reactor pressure of 565 psia and in the presence of 8 ppm TEB in the manner previously described.

The catalyst activating temperatures used and the results obtained are set forth in Table X.

TABLE X

| | Ethylene Polymerization With Silica-Based Catalysts | | | | | |
|---|---|---|---|---|---|---|
| Run No. | Catalyst | | Reactor Temp. °C. | Run Time min. | Calculated Productivity(a) g/25 min. | Polymer HLMI |
| | Support | Temp. °C. | | | | |
| 1 | SiO₂ | 750 | 90 | 20 | 3040 | 0.67 |
| 2 | SiO₂ | 650 | 95 | 22 | 2670 | 1.8 |
| 3 | SiO₂ | 650 | 90(b) | 25 | 2030 | 2.1 |
| 4 | F—SiO₂/SiO₂ | 700 | 90 | 22 | 0 | — |
| 5 | SiO₂—Al₂O₃ | 700 | 85(c) | 25 | 835 | 2.7 |
| 6 | F—SiO₂/SiO₂—Al₂O₃ | 700 | 85(c) | 25 | 227 | 0.28 |

(a)For run times other than 25 minutes, the calculated productivity is normalized to 25 minutes in the manner previously described.
(b)Run in the presence of 50 psi hydrogen.
(c)Run in the presence of 50 psi hydrogen and 5.0 cc 1-hexene.

The results in runs 1-3, 5, 6 show that a measurable polymer HLMI was obtained in the presence of the silica-based catalysts unlike the UHMWPE made with similarly treated alumina-based catalysts.

In addition, the fluoriding, silicating treatment given the silica-based catalysts resulted in decreased catalytic behavior unlike the behavior shown in Table V with the fluorided, silicated treatment of the alumina-based catalysts.

EXAMPLE 11

Ethylene Polymerization With Combination of Chromocene and Dicumene Chromium

A fluorided and silicated alumina was impregnated with dicumene chromium (0 valent) and chromocene (divalent). Polymerization was with hydrogen to control molecular weight. The following results were obtained.

TABLE XI

| Run No. | Base | Chromium | Density[4] | Flex[5] | MI | Intrinsic[6] Viscosity |
|---|---|---|---|---|---|---|
| 1 | AlPO$_4$ | chromocene | 0.9513 | 1228 | 0.51 | — |
| 2 | AlPO$_4$ | DCC[1] | 0.9538 | 963 | 0.14 | — |
| 3 | AlPO$_4$ | chromocene + DDC[3] | 0.9500 | 1064 | 0.26 | — |
| 4 | AlPO$_4$ | chromocene + DDC[3] | 0.9485 | 888 | 0.24 | — |
| 5 | Al$_2$O$_3$[2] | chromocene + DDC[3] | 0.9582 | 1542 | 0.21 | — |
| 6 | Al$_2$O$_3$[2] | chromocene + DDC[3] | 0.9648 | 1592 | 2.7 | — |
| 7 | Al$_2$O$_3$[2] | chromocene + DDC[3] | 0.9286 | — | — | 19 |
| 8 | Al$_2$O$_3$[2] | chromocene + DDC[3] | 0.9276 | — | — | 20 |

[1] Dicumene chromium.
[2] Treated with fluoriding agent and silicating agent.
[3] 1:1 mole ratio.
[4] ASTM D-1505.
[5] Flexural modulus, ASTM D-790, MPa
[6] See Table II, footnote (b).

Runs 7 and 8 show the invention treated alumina with mixed 0 valent and divalent chromium gives ultra high molecular weight polymer with unusually high density. Runs 5 and 6 show the invention alumina with mixed 0 valent and divalent chromium (and H$_2$ to give lower molecular weight) gives very high density and stiffness, better than that obtained with an AlPO$_4$ base, i.e. better than runs 3 and 4.

EXAMPLE 12

Figure 2:
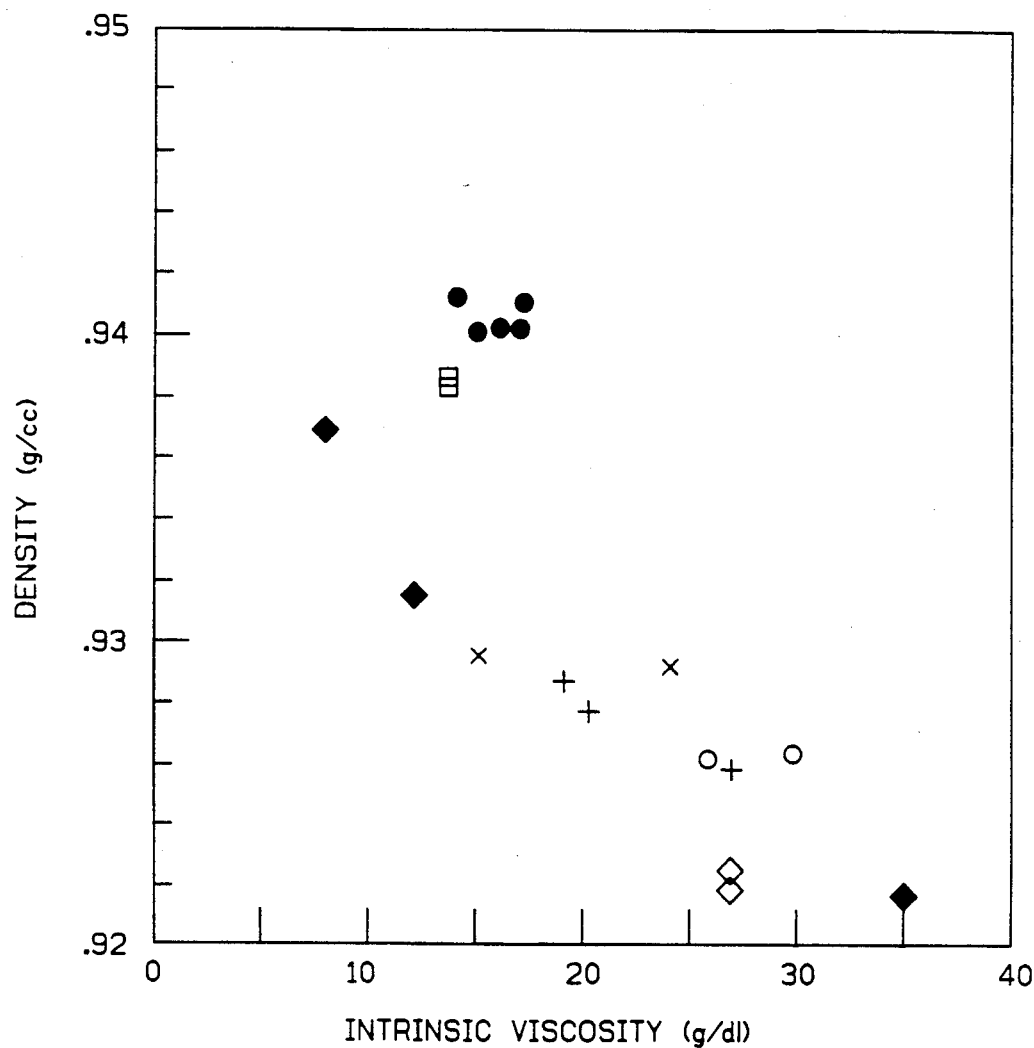
FIG. 2 shows the relationship between polymer density and intrinsic viscosity.

The following data is presented to illustrate what is believed to be an unusual characteristic of polymers made with the Cr(6+)/F-Al$_2$O$_3$ catalyst system. As disclosed in the body of this application, this catalyst produces ultrahigh molecular weight polyethylene, UHMWPE. Generally speaking, density is found to decrease with molecular weight in this type of polymer in the prior art. The hexavalent chromium system mentioned above is unusual in that the UHMWPE polymer produced has the highest density yet observed for polymers of similar molecular weight. Molecular weight is usually correlated to the viscosity of a standardized decalin solution of the polymer according to ASTM procedures D-4020-81, D-2857-70 and D-1601-78. Another, less conventional measure of molecular weight is obtained from the melt viscosity of the polymer using a Rheometrics Dynamic Spectrometer operating at 230° C. and 0.1 radians per second oscillation frequency. The data in FIGS. 1 and 2 illustrate the above mentioned relationships. For both measures of molecular weight, namely melt and intrinsic viscosity, the Cr(6+)/F-Al$_2$O$_3$ catalyst is shown to produce polymer with higher densities than any of the numerous control catalysts within a similar range of molecular weights.

Specifically novel polymers are provided having a melt viscosity (M Poise) of 35 or greater, more specifically about 40-60 or in some instances 50 or greater and a density of 0.940 g/cc or greater, more specifically about 0.940 to 0.950, preferably greater than 0.945 g/cc. Based on intrinsic viscosity, novel polymers are provided having an intrinsic viscosity of greater than 13 g/dL, more specifically 13 to 17 or in some instances 15 to 20 at a density of greater than 0.940, more specifically at a density of 0.940 to 0.950, more preferably at a density at greater than 0.941 g/cc.

EXAMPLE 13

Chromium(II) chloride and the grignard reagent, trimethylsilylmethylmagnesium chloride, were purchased from Alfa Chemical Company. All solvents used were reagent grade and were distilled from the appropriate drying agent (usually calcium hydride) and stored under argon prior to use. Unless indicated otherwise, all manipulations were carried out in an inert atmosphere of either argon or nitrogen.

Synthesis of Octakis-($\mu$-trimethylsilylmethyl)tetrachromium(II), Cr$_4$(TMS)$_8$ Five grams of CrCl$_2$ (40.7 mmol) were suspended in 100 ml of THF under argon. The suspension was cooled to −30° C. and stirred while a solution of 50 ml of the grignard solution ClMgCH$_2$Si(CH$_3$)$_3$ (1.6 molar in ether) diluted with 50 ml of THF was slowly added. After complete addition, the reaction solution was allowed to warm to room temperature and was stirred for another hour at that temperature. The volatiles were then removed under vacuum and the residue extracted with three 100 ml portions of pentane. The combined extracts were filtered through glass wool and the total volume of the solution reduced to 50 ml. After 24 hours at −78° C., brownish-black micro-crystals were separated from the mother liquor and washed once with cold (−78° C.) pentane and dried at −78° C. under vacuum (10$^{-4}$ torr) for 20 hours. Yield: 5.18 g (5.73 mmol, 56%) of the product, Cr$_4$(TMS)$_8$. An additional 1.20 g of product were recovered from the mother liquor by evaporating to dryness. Total yield: 6.38 g (7.05 mmol, 69%). Analysis: for Cr$_4$(TMS)$_8$, C$_{32}$H$_{88}$Si$_8$Cr$_4$, M.W.=905.728.

| | C[a] | H[a] | Cr[b] |
|---|---|---|---|
| calculated: | 42.44 | 9.79 | 22.96 |

-continued

| | $C^{(a)}$ | $H^{(a)}$ | $Cr^{(b)}$ |
|---|---|---|---|
| found: | 42.28 | 9.89 | 25.34 |

$^{(a)}$from C.H.N analysis
$^{(b)}$from plasma emission analysis

The structural formula as determined by single crystal X-ray diffraction is depicted as follows:

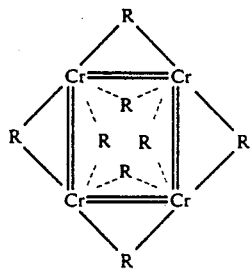

$R = CH_2SiMe_3$

EXAMPLE 14

The same fluorided, silicated alumina base of catalyst D of Example 1 was calcined and impregnated with a solution of tetrakis(trimethylsilylmethyl)chromium(IV) to give a 1 weight percent chromium level. Polymerization runs at 95° C. and 550 psig reactor pressure revealed very high productivity.

The results are as follows:

TABLE XII

| Run | $H_2$, lb | Productivity g/g/hr | HLMI g/10 min | Density$^{(a)}$ | Flexural$^{(b)}$ Modulus, MPa |
|---|---|---|---|---|---|
| 1 | 0 | 14.600 | 0.36 | 0.9510 | 1598 |
| 2 | 5 | 8.800 | 14.2 | 0.9573 | 1078 |

$^{(a)}$ASTM D-1505
$^{(b)}$ASTM D-790

While this invention has been described in detail for the purpose of illustration it is not to be construed as limited thereby but is intended to cover all changes and modifications within the spirit and scope thereof.

That which is claimed is:

1. A polymerization process comprising contacting at least one mono-1-olefin under polymerization conditions with a catalyst and a cocatalyst, wherein said catalyst is produced by contacting alumina with a fluoriding agent to produce a fluorided alumina and subjecting said alumina to a silicating treatment to form a surface silicated and fluorided alumina, said surface silicated and fluorided alumina containing, in addition a chromium component, the resulting composition being activated by heating in an oxygen-containing ambient at a temperature within the range of about 300° to about 900° C. so as to convert at least a portion of the chromium of said chromium component to the hexavalent state.

2. A method according to claim 1 wherein said silicating treatment comprises contacting said alumina with a polymeric siloxane after said contacting with said fluoriding agent and calcining in air at about 500° to about 800° C. to convert the siloxane to silica on the surface of the alumina.

3. A polymerization process comprising contacting at least one mono-1-olefin with a catalyst produced by subjecting alumina to a treatment with a fluoriding agent, thereafter activating at a temperature of about 150° to about 1000° C. and thereafter introducing an organochromium component onto said alumina to produce said catalysts;

wherein said alumina is also subjected to a silicating treatment prior to said activating; and wherein said organochromium component is selected from:

chromium compounds of the formula (I) or (II)

$$Cr(R)_n \quad (I)$$

$$Cr_x(R)_{2x} \quad (II)$$

wherein n is 3 or 4; x is 3 or more; R is —$CH_2MR'R''R'''$; wherein M is C, Si, Ge, Sn or Pb; and wherein in a given compound the R groups are identical and R', R'', and R''' are the same or different hydrocarbyl groups selected from aliphatic and aromatic radicals containing up to about 10 carbon atoms per radical; bis(cyclopentadienyl)chromium and substituted derivatives thereof; and pi bonded zerovalent organochromium compounds.

4. A method according to claim 3 wherein said alumina is admixed with an alcoholic solution of $NH_4HF_2$ and polymeric siloxane.

5. A method according to claim 4 wherein said fluoriding agent is present in an amount sufficient to give 0.3 to 3 weight percent fluorine on said alumina based on the weight of said alumina.

6. A polymerization process comprising contacting at least one mono-1-olefin with a catalyst produced by subjecting alumina to a treatment with a fluoriding agent, thereafter activating at a temperature of about 150° to about 1000° C. and thereafter introducing at least two organochromium components onto said alumina to produce said catalyst;

wherein said alumina is also subjected to a silicating treatment prior to said activating; and wherein said organochromium components are selected from octakis-($\mu$-trimethylsilylmethyl)tetra)-chromium(II), tetrakis-(trimethylsilylmethyl)-chromium(IV), bis(cyclopentadienyl)chromium and dicumene chromium.

7. A polymerization process comprising contacting ethylene with a chromium catalyst on a support produced by impregnating alumina with a liquid containing a source of phosphate ions and at least one aluminum salt and thereafter contacting with a neutralizing agent to form a gel of aluminum phosphate within the pores of said alumina and activating in air at about 300° to about 900° C., to give an ethylene polymer having environmental stress crack resistance of greater than 1,000 hours;

wherein said support is prepared by mixing alumina with a solution contacting $Al(NO_3)_3.9H_2O$, $NH_4H_2PO_4$ and $Cr(NO_3)_3.9H_2O$ in an amount equal to or less than the pore volume of the alumina, adding aluminum hydroxide to cause a gel to form within the pores of the alumina; and wherein said alumina has been modified by the addition of ammonium bifluoride and silica.

* * * * *